(12) United States Patent
Hsueh et al.

(10) Patent No.: US 7,669,091 B2
(45) Date of Patent: Feb. 23, 2010

(54) APPARATUS AND METHOD FOR DEFECT REPLACEMENT

(75) Inventors: Ching-Wen Hsueh, Luodong Town (TW); Shih-Hsin Chen, Jhubei (TW)

(73) Assignee: Mediatek Inc., Taiwan (CN)

( * ) Notice: Subject to any disclaimer, the term of this patent is extended or adjusted under 35 U.S.C. 154(b) by 456 days.

(21) Appl. No.: 11/442,930

(22) Filed: May 30, 2006

(65) Prior Publication Data
US 2007/0300132 A1    Dec. 27, 2007

(51) Int. Cl.
*G11C 29/00* (2006.01)
(52) U.S. Cl. ..................................... 714/710
(58) Field of Classification Search .............. 714/770, 714/710
See application file for complete search history.

(56) References Cited
U.S. PATENT DOCUMENTS
5,442,638 A * 8/1995 Awad et al. ................. 714/6
6,782,488 B1   8/2004 Park et al.
7,380,178 B2 * 5/2008 Park et al. .................. 714/47

FOREIGN PATENT DOCUMENTS
CN           1529316        9/2004

* cited by examiner

*Primary Examiner*—James C Kerveros
(74) *Attorney, Agent, or Firm*—Ladas and Parry LLP

(57) ABSTRACT

Apparatuses and methods for defect replacement when an optical storage medium is read are provided. When the defect management is LOW, a pick-up head retrieves a set of data from the optical storage medium; a defect detector detects whether there is a defect in the set; if yes, a processor determines whether a replacement for the defect is in the set; and if yes, an interface transmits the replacement from the set. When the defect management is CRD, a buffer temporarily stores data retrieved from the optical storage medium; a defect detector detects whether there is a set of defects in the data; if yes, a comparator compares a length of the set of defects with a defect threshold length; a pick-up head reads more data from the optical storage medium continuously until the buffer reaches a buffer threshold if the length is compared shorter than the defect threshold length; and the pick-up head reads a set of replacements for the set of defects directly if the length is compared longer than the defect threshold length.

18 Claims, 8 Drawing Sheets

APPARATUS AND METHOD FOR DEFECT REPLACEMENT

CROSS-REFERENCES TO RELATED APPLICATIONS

Not applicable.

BACKGROUND OF THE INVENTION

1. Field of the Invention

The present invention relates to apparatuses and methods for defect replacement when an optical storage medium is read.

2. Descriptions of the Related Art

Most of optical storage media might have some defects in data area because of scratches, dusts, or fingerprints when exposing to a free environment. To recover the defects, the optical storage media provide an electronic structure to record defective addresses where defects are detected and spare area in which replacement data can be stored. For a conventional optical storage medium such as a compact disc, there are defect management areas (DMAs) to store replacements for the defects.

FIG. 1A shows a cross-sectional view of a one-layer compact disc. As FIG. 1A shows, the DMAs are implemented in an inner spare area (ISA) 101 and an outer spare Area (OSA) 103. The ISA 101 is allocated in an inner side of a valid data area 105, and the OSA 103 is allocated in an outer side of the valid data area 105. The valid data area 105 further comprises a user data area 109 for storing data. If there is any defect in the user data area 109, a corresponding replacement is stored in either the ISA 101 or the OSA 103. FIG. 1B shows a cross-sectional view of a two-layer compact disc. As FIG. 1B shows, each layer of the two-layer compact disc comprises the ISA 101, such as ISA 101A or 101B, and the OSA 103, such as 103A or 130B, for storing replacements.

One method of the prior art for defect replacement when a read operation is executed is shown in FIG. 2. Step 201 is executed to read a set of data from the user data area 109. In step 203, the optical access apparatus of the prior art determines if there is a defect in the set of data. If no, step 205 is executed to read another set of data. If yes, step 207 is executed to stop the reading. Step 209 is then executed to find a location of a corresponding replacement for the defect. After that, step 211 is executed to seek to the location to read the corresponding replacement. The defect is hence replaced by the corresponding replacement so the set of data has no defect now.

Another method of the prior art is shown in FIG. 3. When step 301 is executed, a set of data is read from the user data area 109 and stored to a first memory of the optical storage medium. In general, the first memory is a ring buffer. In step 303, the optical access apparatus of the prior art determines if there is a defect in the set of data. If no, step 305 is executed to read another set of data. If yes, step 307 is executed to record a current identification of the disc $ID_{start}$. Step 309 is then executed to read more sets of data continuously from the user data area 109 and store to the first memory until the first memory is full. Then step 311 is executed to record a current identification of the disc $ID_{end}$. After that, step 313 is executed to seek addresses of all defects and corresponding replacements between $ID_{start}$ and $ID_{end}$. In step 315, the corresponding replacements are stored to a second memory of the optical access apparatus. Step 317 is then executed to copy the corresponding replacements stored in the second memory to the first memory. The defects are hence replaced by the replacements so the set of data has no defect now.

Though seek operations are common when data are reading from the optical storage media, the frequency of executing seek operations for the defect replacements is too high. Since the replacements are stored in the inner side or the outer side of the valid data area 105, such seek operations take a lot of time. Therefore, the speed of read decreases. Due to the above-mentioned drawback, a solution, especially for blu-ray discs, to efficiently execute defect replacement is needed in the industrial field.

SUMMARY OF THE INVENTION

An object of this invention is to provide an apparatus for defect replacement when an optical storage medium is read. The apparatus comprises: a pick-up head for retrieving a set of data from the optical storage medium; a defect detector for detecting whether there is a defect in the set; a processor for determining whether a corresponding replacement for the defect is in the set if the defect detector detects a defect in the set; and an interface for transmitting the corresponding replacement from the set if the processor determines that the replacement is in the set.

Another object of this invention is to provide a method for defect replacement when an optical storage medium is read. The method comprises the steps of: retrieving a set of data from the optical storage medium; detecting whether there is a defect in the set; determining whether a corresponding replacement for the defect is in the set if there is a defect determined in the set; and transmitting the corresponding replacement from the set if the corresponding replacement is determined in the set.

Another object of this invention is to provide an apparatus for defect replacement when an optical storage medium is read. The apparatus comprises: a buffer for temporarily storing data retrieved from the optical storage medium; a defect detector for detecting whether there is a set of defects in the data; a comparator for comparing a length of the set of defects with a defect threshold length if there is a set of defects in the data; and a pick-up head for reading more data from the optical storage medium continuously until the buffer reaches a predetermined buffer threshold if the length is compared shorter than the defect threshold length and for reading a set of corresponding replacements for the set of defects directly if the length is compared longer than the defect threshold length.

Yet a further object of this invention is to provide a method for defect replacement when an optical storage medium is read. The method comprises the steps of: setting a defect threshold length; detecting whether there is a set of defects; comparing a length of the set of defects with the defect threshold length if there is a set of defects; reading data from the optical storage medium continuously until a buffer for temporarily storing the data reaches a predetermined buffer threshold if the length is compared shorter than the defect threshold length; and reading a set of corresponding replacements for the set of defects directly if the length is compared longer than the defect threshold length.

The present invention has advantage of saving time and power for an apparatus to operate defect replacement.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1A:
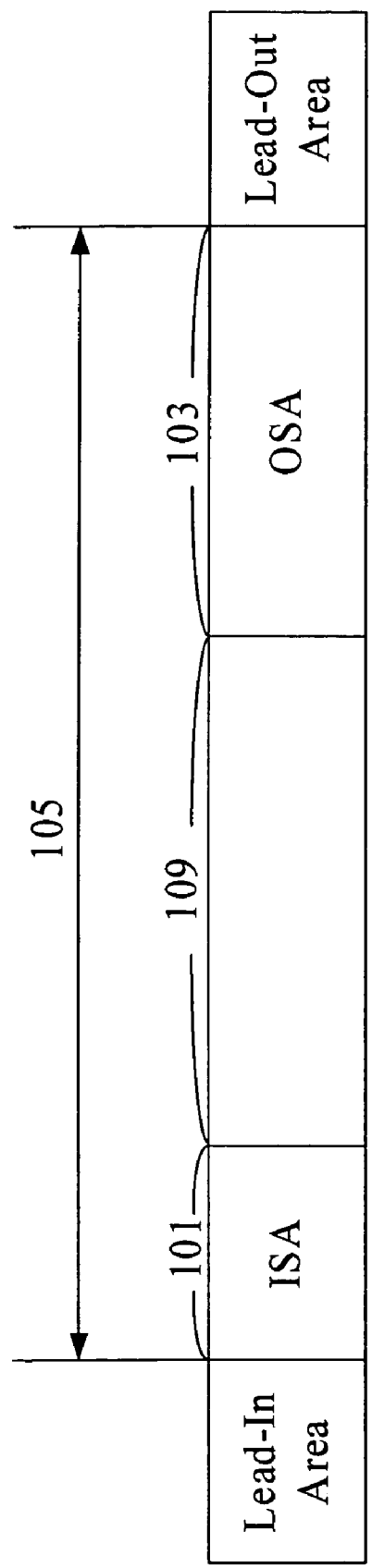
FIG. 1A shows a cross-sectional view of a one-layer compact disc of the prior art.
Figure 1B:
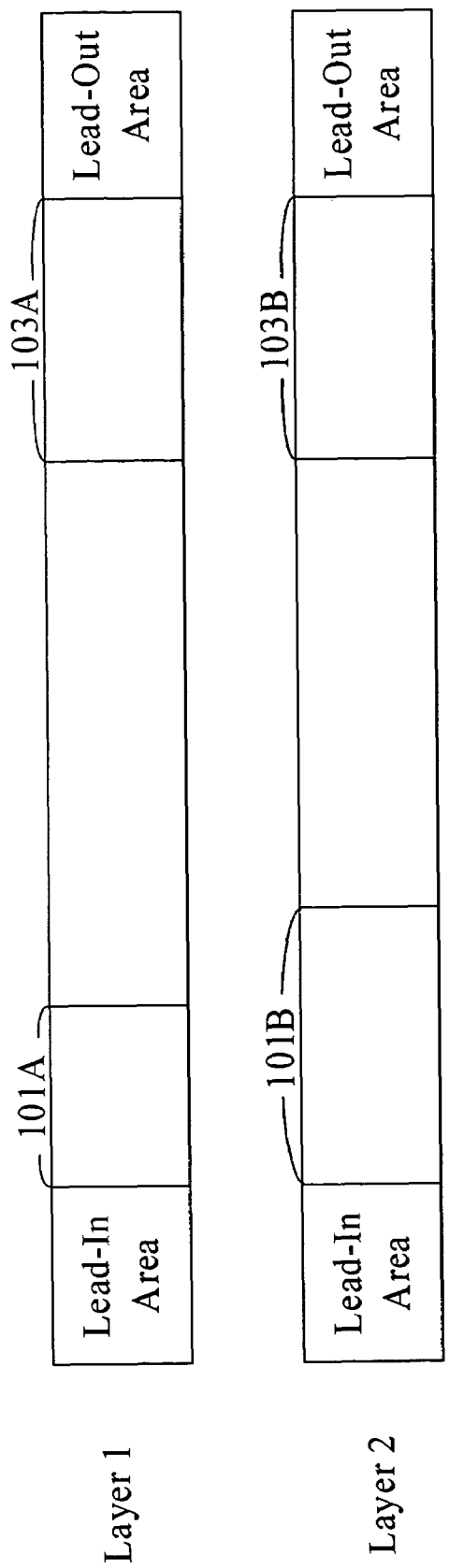
FIG. 1B shows a cross-sectional view of a two-layer compact disc of the prior art.
Figure 2:
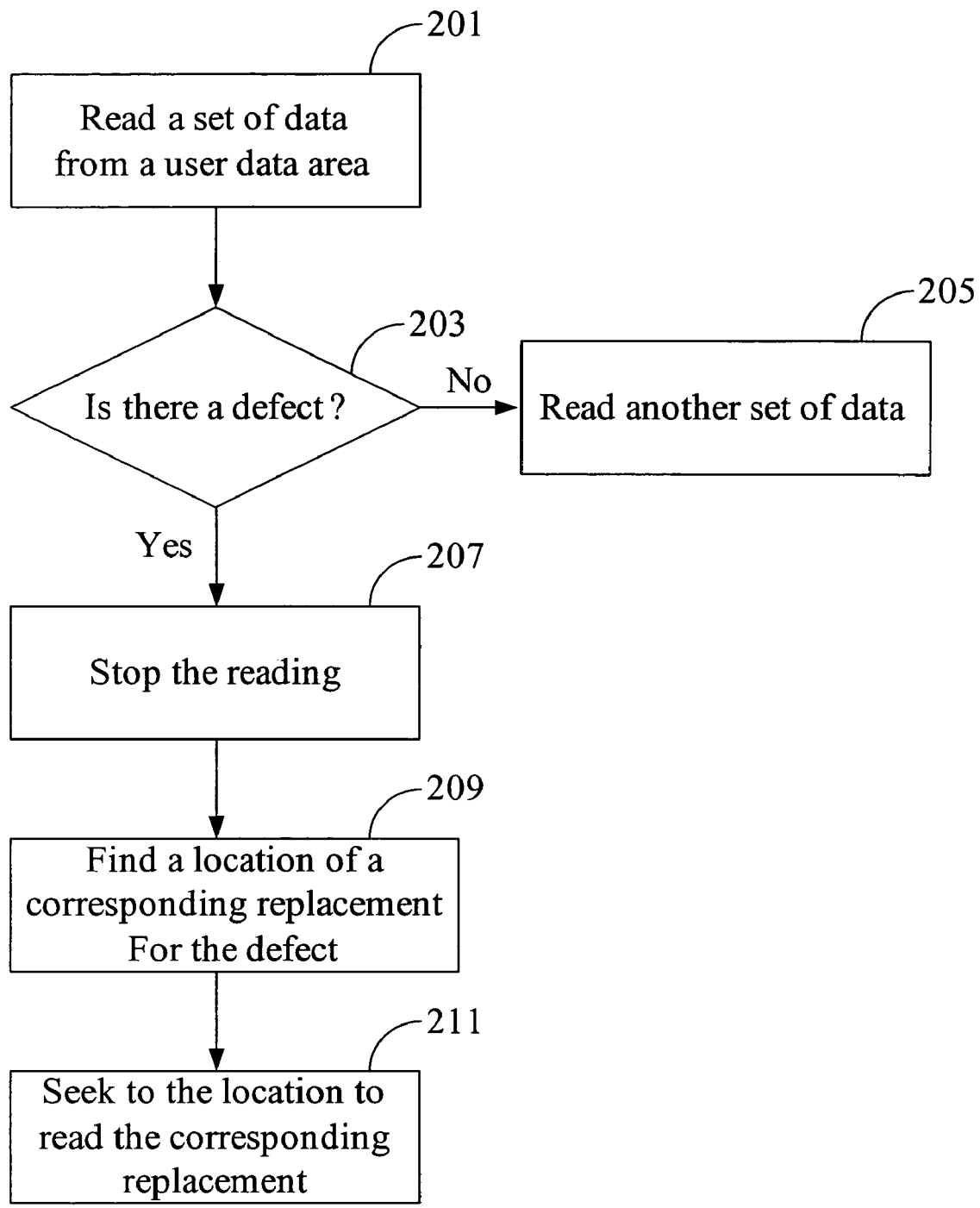
FIG. 2 shows a flow chart of a defect replacement of the prior art.
Figure 3:
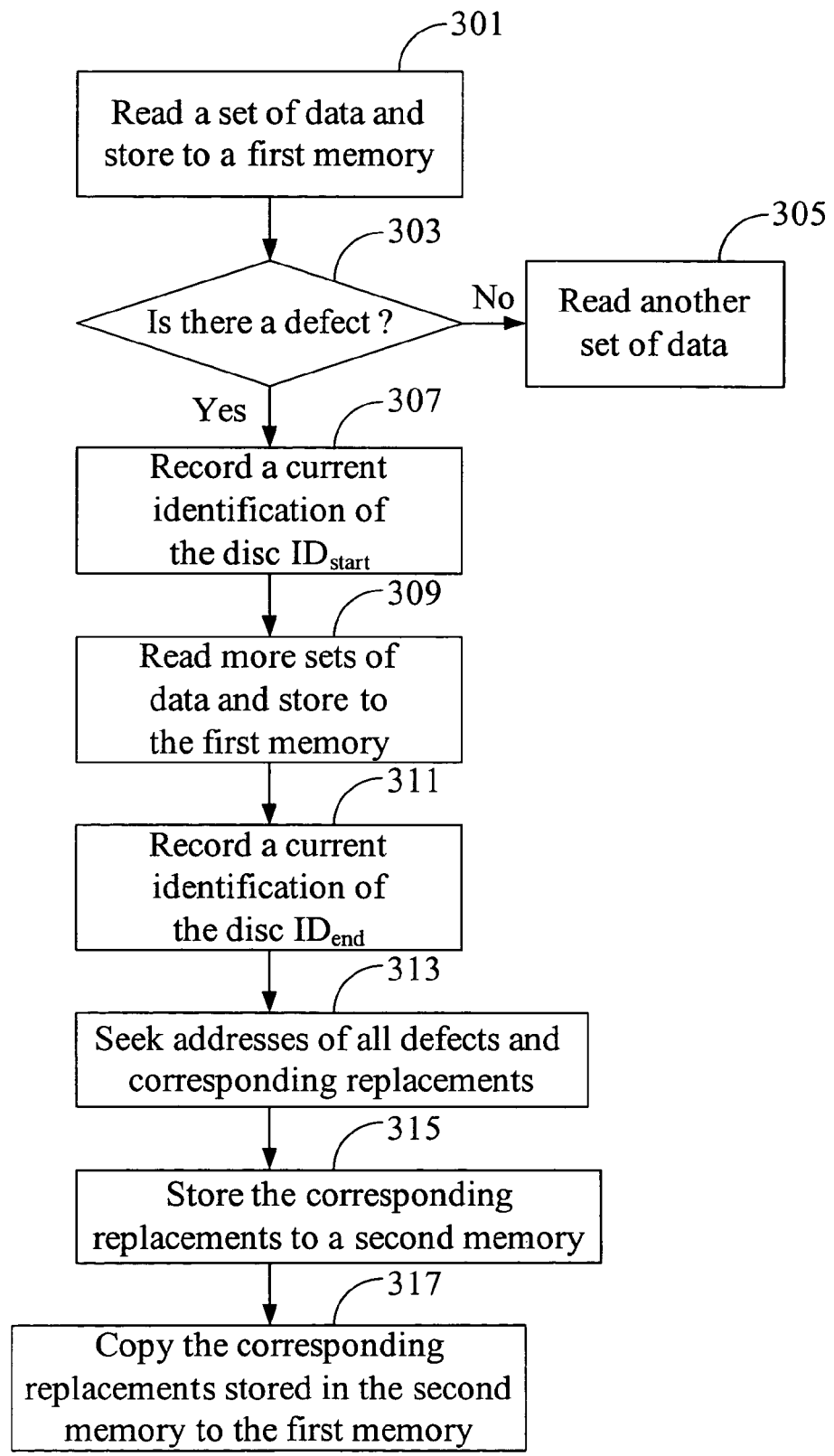
FIG. 3 shows a flow chart of another defect replacement of the prior art.

For blu-ray discs, there are some methodologies to recover defects, such as logical overwrite (LOW) and contiguous re-allocated defect (CRD). The arrangements of the methodologies are different from the aforementioned defect managements shown in FIG. 1A and FIG. 1B. For LOW, a defect and a corresponding replacement for the defect are stored in a neighboring sector. Thus, if there is a defect, the corresponding replacement for the defect is quickly found in the neighboring sector, and the time for defect replacement can be reduced. For CRD, defects are arranged continuously which are defined by a start address and an end address. Since the defects are stored continuously, the time of seeking is reduced.

Figure 4:
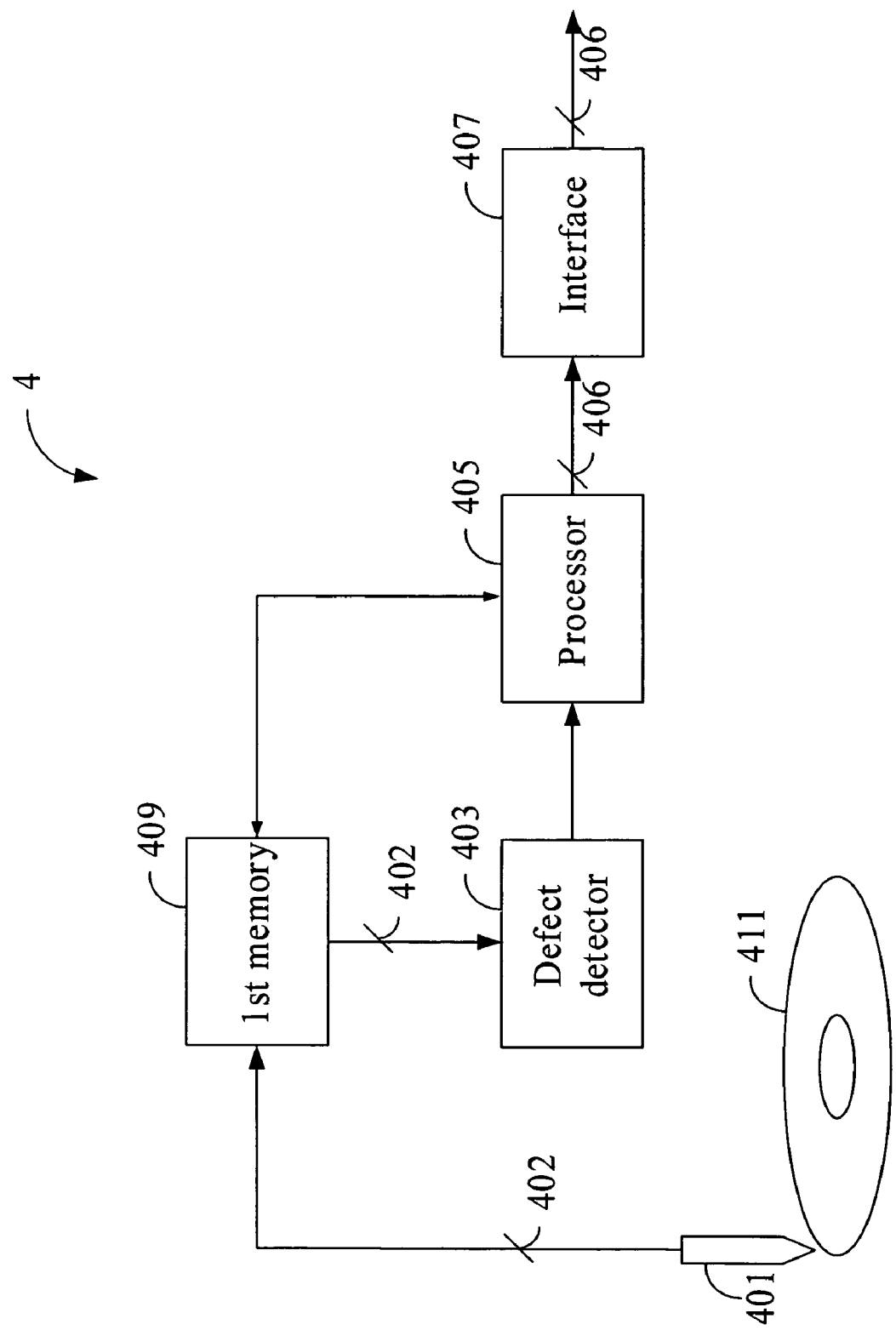
FIG. 4 shows a block diagram of a first embodiment of the present invention.

A first embodiment of the present invention is an optical access apparatus, such as a blu-ray disc drive, as shown in FIG. 4. The optical access apparatus 4 comprises a pick-up head 401, a defect detector 403, a processor 405, an interface 407 and a memory 409 for defect replacement in a LOW mode. When the optical access apparatus 4 executes a read operation, the pick-up head 401 retrieves a set of data 402 from an optical storage medium 411, e.g., a blu-ray disc. The set of data 402 is temporarily stored in the memory 409, which is normally a DRAM. The defect detector 403 retrieves the set of data 402 from the memory 409 to detect whether there is a defect in the set of data 402. If there is no defect, a correct set of data 406 is transmitted to the interface 407 directly through the processor 405. If the defect detector 403 detects a defect in the set of data 402, a signal carrying information of the defect is transmitted to the processor 405. The processor 405 determines whether there is a corresponding replacement for the defect in the set of data 402 in response to the signal. If yes, the processor 405 replaces the defect with the corresponding replacement and stores the correct set of data 406 in the memory 409 so that the correct set of data 406 can be then transmitted to the interface 407. Alternatively, the processor 405 may replace the defect with the corresponding replacement while the interface 407 transmits the corresponding replacement if there is the corresponding replacement for the defect in the set of data 402.

If the processor 405 determines that the corresponding replacement for the defect is neither in the set of data 402 nor in the memory 409, the processor 405 further determines whether the corresponding replacement is about to be retrieved from the optical storage medium 411. In this embodiment, the processor 405 treats that the corresponding replacement is about to be retrieved when the pick-up head 401 is going to retrieve the corresponding replacement in the next few tracks. If yes, the pick-up head 401 just executes a track following to retrieve the corresponding replacement and other data from the optical storage medium 411 without particularly seeking to retrieve the corresponding replacement first and returning to retrieve other data after the retrieval of the corresponding replacement. If the corresponding replacement is not about to be retrieved, the pick-up head 401 executes a short seek or a long seek, depending on the seek distance, to retrieve the corresponding replacement from the optical storage medium 411. After the corresponding replacement is retrieved and stored in the memory 409, the processor 405 replaces the defect with the corresponding replacement and stores the replaced set, i.e. the correct set of data 406, in the memory. Then the interface 407 transmits the correct set of data 406 with the corresponding replacement instead of the defect.

Figure 5:
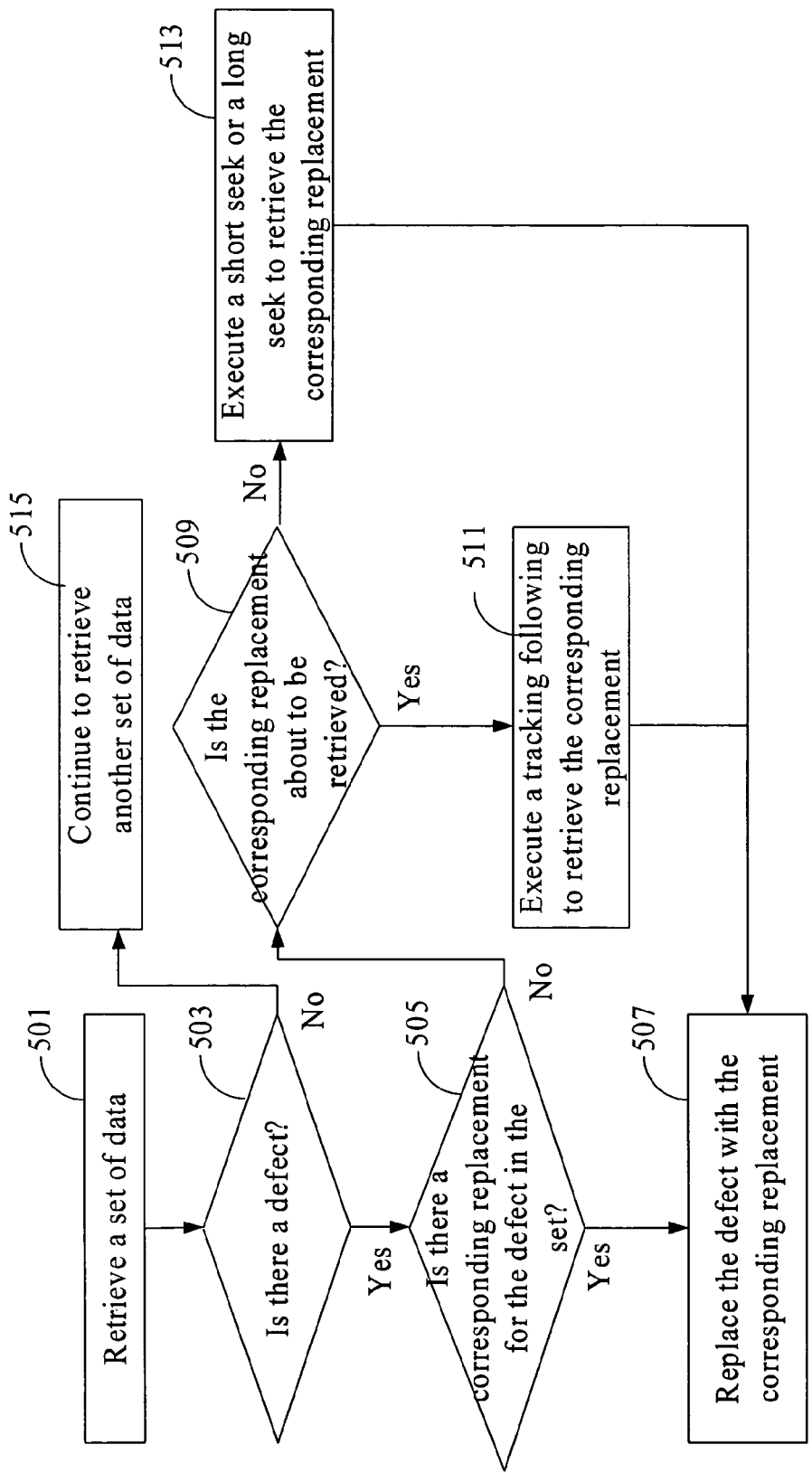
FIG. 5 shows a flow chart of a second embodiment of the present invention.

A second embodiment of the present invention is a method for executing defect replacement in a LOW mode when an optical storage medium is read. The method is adapted for an optical access apparatus, like the aforementioned apparatus 4. FIG. 5 shows a flow chart of the second embodiment. In step 501, a pick-up head retrieves a set of data from the optical storage medium, e.g., a blu-ray disc. The set of data is temporarily stored in a memory, which is normally a DRAM. In step 503, a defect detector retrieves the set of data from the memory to detect whether there is a defect in the set of data. If yes, step 505 is executed in which the processor determines whether there is a corresponding replacement for the defect in the set of data. If yes, step 507 is executed in which the interface transmits a correct set of data with the corresponding replacement instead of the defect. More particularly, the processor replaces the defect with the corresponding replacement and stores the correct set of data in the memory so that the correct set of data can be then transmitted to the interface. Alternatively, the processor may replace the defect with the corresponding replacement while the interface transmits the corresponding replacement.

If the result of step 505 is no, the method comprises a step of retrieving and transmitting the corresponding replacement from the optical storage medium. In particular, step 509 is executed in which the processor determines whether the corresponding replacement is about to be retrieved. If yes, step 511 is executed wherein the pick-up head executes a track following to retrieve the corresponding replacement from the optical storage medium. If no, step 513 is executed wherein the pick-up head executes a short seek or a long seek to retrieve the corresponding replacement from the optical storage medium. After step 511 or 513 is executed, the method goes to step 507 to replace the defect with the corresponding replacement. The frequency for seeking the corresponding replacement is reduced thereby.

Alternatively, in step 511, the pick-up head may execute a short seek or a long seek directly to retrieve the corresponding replacement from the optical storage medium.

If there is no defect detected in the set in step 503, it means defect replacement is unnecessary so step 515 is executed in which the pick-up head continues to retrieve another set of data from the optical storage medium.

In addition to the steps shown in FIG. 5, the second embodiment is able to perform all of the operations or functions recited in the first embodiment.

Figure 6:
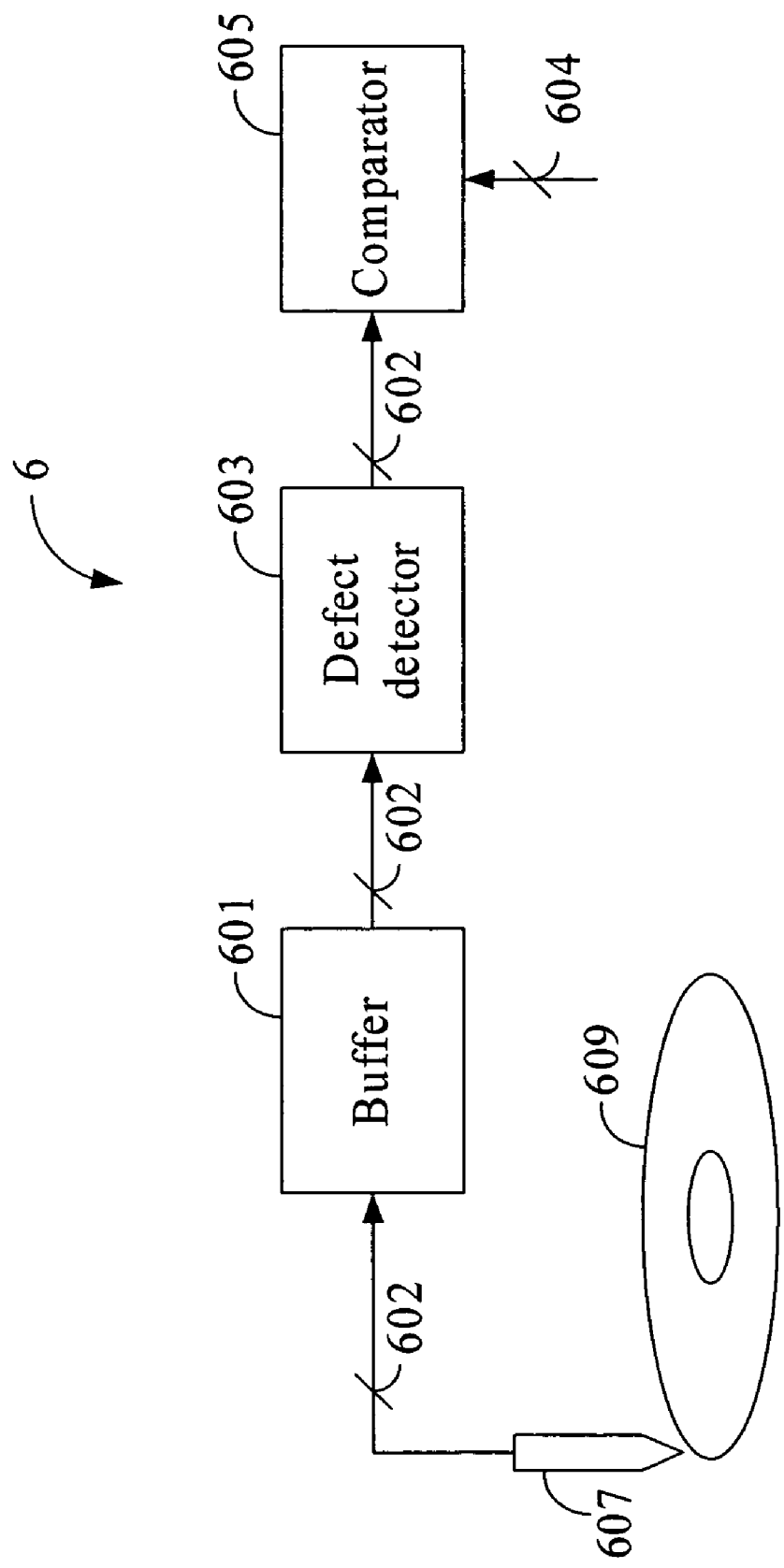
FIG. 6 shows a block diagram of a third embodiment of the present invention.

A third embodiment of the present invention is an optical access apparatus, such as a blu-ray disc drive, as shown in FIG. 6. The apparatus 6 comprises a buffer 601, a defect detector 603, a comparator 605, and a pick-up head 607 for defect replacement in a CRD mode. The pick-up head 607 is configured to retrieve data 602 from an optical storage medium 609. The buffer 601, normally a DRAM, is configured to temporarily store data 602 retrieved from the optical storage medium 609 by the pick-up head 607. The defect detector 603 is configured to detect whether there is a set of defects in the data 602. The comparator 605 is configured to receive the data 602 and compare a length of the set of defects with a defect threshold length 604 if there is a set of defects in the data 602. The defect threshold length 604 could be predetermined according to experiments or calculations. If the length is compared shorter than the defect threshold length 604, the pick-up head 607 reads more data from the optical storage medium 609 continuously until the buffer 601 reaches a predetermined buffer threshold. The length being shorter than the defect threshold length 604 means that the set of defects is too short so that taking immediate replacement operation wastes time and power. Therefore, the pick-up head 607 does not need to retrieve a set of corresponding replacements for the set of defects until the buffer 601 reaches the predetermined buffer threshold, i.e., is nearly full. If the length is compared longer than the defect threshold length 604, the pick-up head 607 reads a set of corresponding replacements for the set of defects directly. The length of the set of defects being longer than the defect threshold length 604 means that the set of defects is long enough to be handled immediately. The frequency for seeking the corresponding replacement is reduced thereby.

Figure 7:
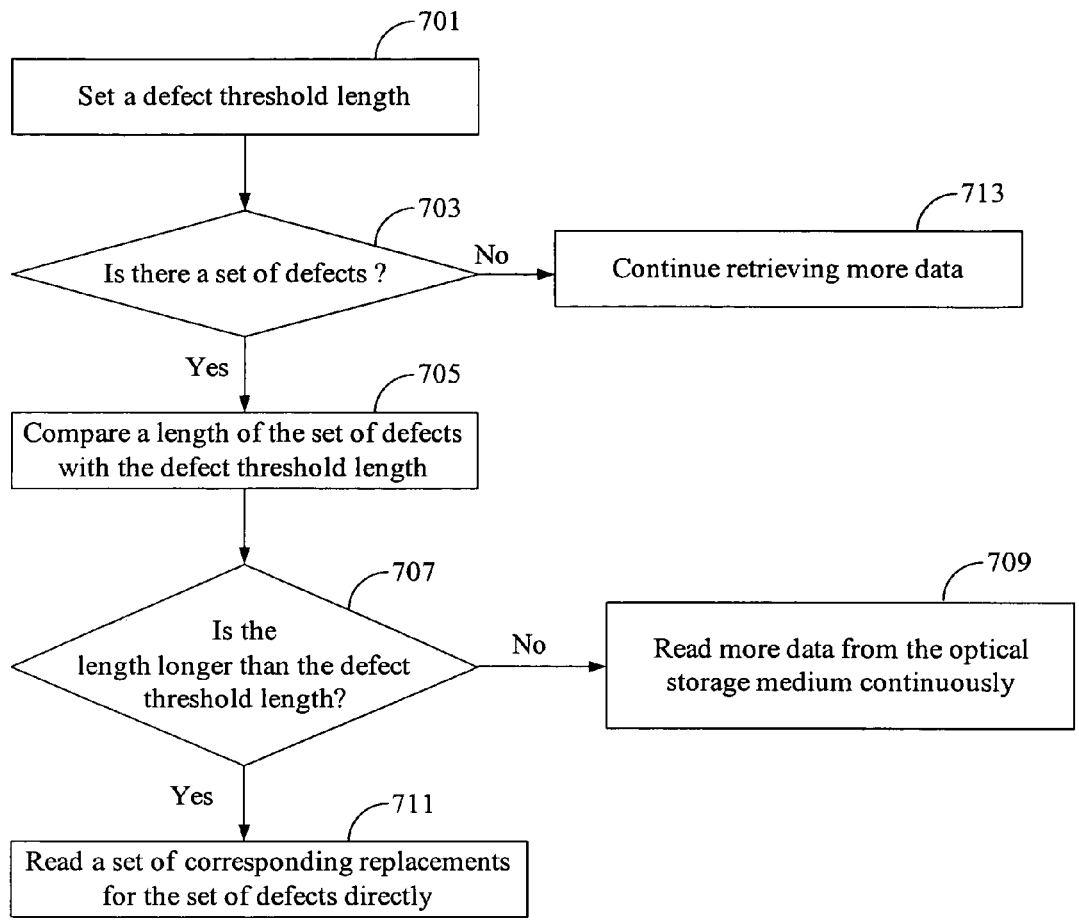
FIG. 7 shows a flow chart of a fourth embodiment of the present invention.

A fourth embodiment of this invention is a method for executing defect replacement in a CRD mode when an optical storage medium is read. The method is adapted for an optical access apparatus, like the aforementioned apparatus 6. FIG. 7 shows a flow chart of the fourth embodiment. In step 701, a defect threshold length is set according to experiments or calculations. Step 703 is executed to detect whether there is a set of defects in data retrieved from the optical storage medium. If yes, step 705 is executed to compare a length of the set of defects with the defect threshold length. Then step 707 is executed to determine whether the length is longer than the defect threshold length. If no, step 709 is then executed to read more data from the optical storage medium continuously until a buffer for temporarily storing the data reaches a predetermined buffer threshold. Once the buffer reaches the predetermined buffer threshold, a set of corresponding replacements for the set of defects is read. If yes, step 711 is executed to read a set of corresponding replacements for the set of defects directly. The frequency for seeking the corresponding replacement is reduced thereby.

If there is no defect detected in the set in step 703, it means that no defect replacement is necessary so step 713 is executed to continue retrieving more data from the optical storage medium.

In addition to the steps shown in FIG. 7, the fourth embodiment is able to perform all of the operations or functions recited in the third embodiment.

The present invention may save time and power by reducing the opportunity of executing seek operations during defect replacement. Especially for blu-ray disc drives, the present invention has extreme efficiency when defect management is in LOW mode or CRD mode.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An apparatus for defect replacement when an optical storage medium is read, comprising:
    a pick-up head for retrieving a set of data from the optical storage medium;
    a defect detector for detecting whether there is a defect in the set;
    a processor for determining whether a corresponding replacement for the defect is in the set if the defect detector detects a defect in the set; and
    an interface for transmitting the corresponding replacement from the set if the processor determines that the corresponding replacement is in the set.

2. The apparatus as claimed in claim 1, wherein the set is stored in a memory after being retrieved from the optical storage medium, and the defect detector retrieves the set from the memory.

3. The apparatus as claimed in claim 1, wherein the processor replaces the defect with the corresponding replacement while the interface transmits the corresponding replacement.

4. The apparatus as claimed in claim 1, wherein the processor replaces the defect with the corresponding replacement and stores the replaced set in a memory, and the interface retrieves the replaced set for the transmission.

5. The apparatus as claimed in claim 1, wherein the pick-up head retrieves the corresponding replacement from the optical storage medium if the processor determines that the corresponding replacement is not in the set, and the interface transmits the corresponding replacement retrieved from the optical storage medium.

6. The apparatus as claimed in claim 5, wherein if the processor determines that the corresponding replacement is not in the set, the processor further determines whether the corresponding replacement is about to be retrieved, and the pick-up head executes a track following to retrieve the corresponding replacement if the processor determines that the corresponding replacement is about to be retrieved.

7. The apparatus as claimed in claim 6, wherein the pick-up head executes a short seek to retrieve the corresponding replacement if the processor determines that the corresponding replacement is not about to be retrieved.

8. The apparatus as claimed in claim 6, wherein the pick-up head executes a long seek to retrieve the corresponding replacement if the processor determines that the corresponding replacement is not about to be retrieved.

9. The apparatus as claimed in claim 5, wherein if the processor determines that the corresponding replacement is not in the set, the processor further determines whether the corresponding replacement is about to be retrieved, and the pick-up head executes one of a short seek and a long seek to retrieve the corresponding replacement if the processor determines that the corresponding replacement is about to be retrieved.

10. A method for defect replacement when an optical storage medium is read, comprising:
    retrieving a set of data from the optical storage medium;
    detecting whether there is a defect in the set;
    determining whether a corresponding replacement for the defect is in the set if there is a defect determined in the set; and
    transmitting the corresponding replacement from the set if the corresponding replacement is determined in the set.

11. The method as claimed in claim 10, further comprising the step of:

storing the set in a memory:

wherein the detecting step retrieves the set from the memory.

12. The method as claimed in claim 10, wherein the transmitting step comprises the step of replacing the defect with the corresponding replacement for the transmission.

13. The method as claimed in claim 10, further comprising the steps of:

replacing the defect with the corresponding replacement; and storing the replaced set in a memory;

wherein the transmitting step retrieves the replaced set.

14. The method as claimed in claim 10, further comprising the step of:

retrieving and transmitting the corresponding replacement from the optical storage medium if the corresponding replacement is determined not in the set.

15. The method as claimed in claim 14, wherein the step of retrieving and transmitting the corresponding replacement comprises the steps of:

determining whether the corresponding replacement is about to be retrieved; and executing a track following of a pick-up head to retrieve the corresponding replacement if the corresponding replacement is determined about to be retrieved.

16. The method as claimed in claim 15, wherein the step of retrieving and transmitting the corresponding replacement comprises the step of:

executing a short seek for the pick-up head to retrieve the corresponding replacement if the corresponding replacement is determined not about to be retrieved.

17. The method as claimed in claim 15, wherein the step of retrieving and transmitting the corresponding replacement comprises the step of:

executing a long seek for the pick-up head to retrieve the corresponding replacement if the corresponding replacement is determined not about to be retrieved.

18. The method as claimed in claim 14, wherein the step of retrieving and transmitting the corresponding replacement comprises the steps of:

determining whether the corresponding replacement is about to be retrieved; and executing a seek of the pick-up head to retrieve the corresponding replacement if the corresponding replacement is determined about to be retrieved;

wherein the seek is one of a short seek and a long seek.

* * * * *